(12) United States Patent
Simon et al.

(10) Patent No.: US 10,665,109 B1
(45) Date of Patent: May 26, 2020

(54) CONSTRUCTION ZONE APPARATUS AND METHOD

(71) Applicant: sibrtech inc., West Bloomfield, MI (US)

(72) Inventors: Anthony Luke Simon, West Bloomfield, MI (US); Joseph Buck, Northville, MI (US); Michael Patrick Simon, Princeton, NJ (US)

(73) Assignee: sibrtech inc. MI (US)

( * ) Notice: Subject to any disclaimer, the term of this patent is extended or adjusted under 35 U.S.C. 154(b) by 0 days.

(21) Appl. No.: 16/414,913

(22) Filed: May 17, 2019

(51) Int. Cl.
*G06K 9/78* (2006.01)
*G08G 1/16* (2006.01)
*G05D 1/02* (2020.01)

(52) U.S. Cl.
CPC .......... *G08G 1/167* (2013.01); *G05D 1/0212* (2013.01); *G05D 1/0276* (2013.01); *G08G 1/164* (2013.01)

(58) Field of Classification Search
CPC ...... G08G 1/0145; G08G 1/167; G08G 1/164; G05D 1/0088; G05D 1/0212; G05D 1/0214; G05D 1/0276; G06K 9/00805; G06K 9/6218; G06K 9/628; G01C 21/3691; B60W 40/08; B60W 50/14
See application file for complete search history.

(56) References Cited

U.S. PATENT DOCUMENTS

| | | | |
|---|---|---|---|
| 8,996,228 B1 * | 3/2015 | Ferguson | G05D 1/021 701/28 |
| 9,129,519 B2 | 9/2015 | Aoude | |
| 10,101,745 B1 | 10/2018 | Sun | |
| 10,235,882 B1 | 3/2019 | Aoude | |
| 2014/0063232 A1 * | 3/2014 | Fairfield | B62D 6/00 348/118 |
| 2014/0088855 A1 * | 3/2014 | Ferguson | G08G 1/166 701/117 |
| 2017/0242436 A1 * | 8/2017 | Creusot | G08G 1/005 |
| 2017/0286782 A1 * | 10/2017 | Pillai | B60W 40/08 |
| 2018/0004211 A1 * | 1/2018 | Grimm | G01C 21/3407 |
| 2018/0259966 A1 * | 9/2018 | Long | G08G 1/00 |
| 2018/0330607 A1 | 11/2018 | Ioli | |
| 2018/0365910 A1 * | 12/2018 | Jenkins | G05D 1/0274 |
| 2019/0023266 A1 * | 1/2019 | Kouri | G01C 21/00 |
| 2019/0026886 A1 | 1/2019 | Ferguson | |
| 2019/0035266 A1 | 1/2019 | Reiss | |
| 2019/0035268 A1 | 1/2019 | Madigan | |
| 2019/0049262 A1 | 2/2019 | Grimm | |
| 2019/0049958 A1 | 2/2019 | Liu | |

(Continued)

*Primary Examiner* — An T Nguyen (57) ABSTRACT

An example method and apparatus are disclosed. An infrastructure device is mounted to construction equipment located at a road construction zone with an input view of a predefined area of a road. The device may receive sensor data of road users and the road construction zone. Responsive to the sensor data, the device classifies objects as construction lane markers and determines coordinates of the construction lane markers. Using map data indicative of drivable lane boundaries of the road construction zone, the device determines whether the construction lane markers are within the drivable lane boundaries. Responsive to the determination, temporary lane boundaries for the construction zone are computed and transmitted in a data set to at least one autonomous vehicle.

4 Claims, 7 Drawing Sheets

(56) References Cited

U.S. PATENT DOCUMENTS

| | | |
|---|---|---|
| 2019/0049992 A1 | 2/2019 | Riess |
| 2019/0052842 A1 | 2/2019 | Du |
| 2019/0053154 A1 | 2/2019 | Song |
| 2019/0066490 A1 | 2/2019 | Skvarce |
| 2019/0066498 A1 | 2/2019 | Baldwin |
| 2019/0088148 A1 | 3/2019 | Jacobus |
| 2019/0130736 A1* | 5/2019 | Silver .................. G05D 1/0088 |
| 2019/0163178 A1* | 5/2019 | Sidle ..................... G01S 13/862 |
| 2019/0220011 A1* | 7/2019 | Della Penna ........ G05D 1/0212 |
| 2019/0220678 A1* | 7/2019 | Guo ................. G08G 1/096775 |

\* cited by examiner

CONSTRUCTION ZONE APPARATUS AND METHOD

This application contains subject matter in common with application 16/414,889, entitled, Road User Detecting and Communication Device and Method, filed concurrently with this application, the contents of which are incorporated herein by reference.

BACKGROUND OF THE INVENTION

Advances in technology and transportation have demonstrated systems to automate the driving of passenger and freight transportation vehicles, to communicate various road information to road users, to communicate various information between vehicles (V2V), and to communicate between vehicles and non-vehicle road users, as well as infrastructure (V2X).

SUMMARY OF THE INVENTION

In an example, an infrastructure device is mounted on construction equipment located at a road construction zone with an input view of a predefined area of a road. The device implements a method in which it receives sensor data of road users and the road construction zone. Responsive to the sensor data, the device classifies objects as construction lane markers and determines coordinates of the construction lane markers. Using map data indicative of drivable lane boundaries of the road construction zone, the device determines whether the construction lane markers are within the drivable lane boundaries. Responsive to the determination, temporary lane boundaries for the construction zone are computed and transmitted in a data set to an autonomous vehicle.

In an example, an infrastructure device may also determine a first classification of a road user and the road user's location coordinates and transmit the location coordinates in the data set.

In an example, the infrastructure device may also determine a predicted path of the road user responsive to the first classification and transmit the predicted path in the data set.

According to an example, an apparatus includes an equipment located in a road construction zone and a device mounted to the construction zone equipment. The device includes hardware for receiving sensor input data of a road segment proximate to the road construction zone. A processing system responds to the sensor input data, classifies objects as construction lane markers and determines coordinates of the construction lane markers. A boundary tracking module responds to the classified objects and a map data set including drivable lane boundaries to determine whether the construction lane markers are within the drivable lane boundaries. The boundary tracking module sets temporary lane boundaries if the construction lane markers are within the drivable lane boundaries. A communication system includes a data module to create a data set including the temporary lane boundaries and a transmission module transmitting the data set to an autonomous vehicle.

DETAILED DESCRIPTION

Figure 1:
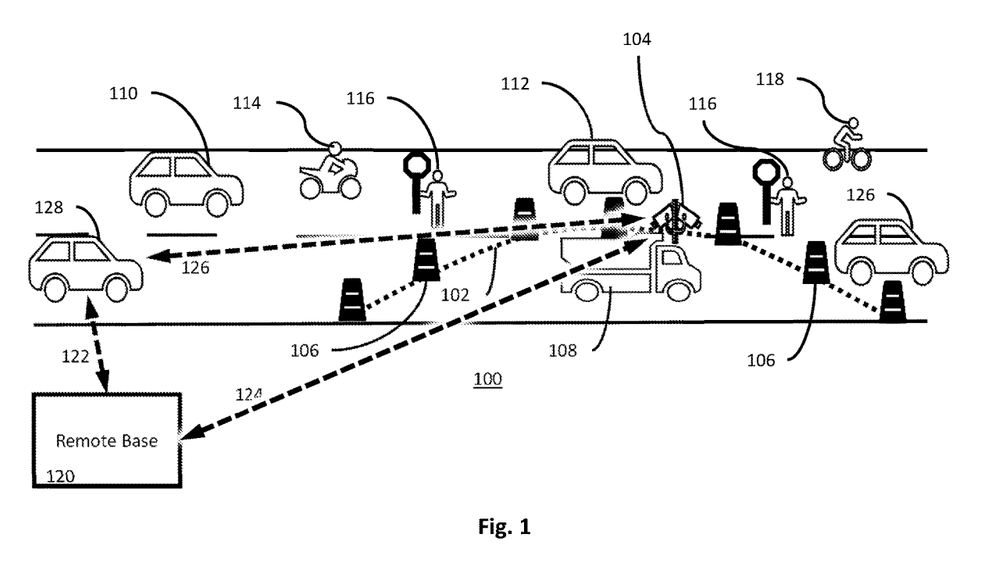
FIG. 1 is a diagram of a road system, road users, and components for implementing an example of this invention.

FIG. 1 illustrates a road system 100 including road users 110, 112, 114, 118, 126, and 128, construction equipment 108, temporary infrastructure device 104 mounted to construction equipment 108, construction workers 116, and road construction markers 106 (shown here as construction barrels). In this example, a temporary infrastructure device 104 is shown mounted to the construction equipment 108, which is a construction vehicle. The temporary infrastructure device 104 need not be mounted to a vehicle. It can instead be mounted to other construction equipment that is, for example, set in place by construction workers upon arrival to the road construction site.

Upon setup, the temporary infrastructure device 104 is activated and, using GPS and/or other location matching techniques known in the art, sets its location and sends its location to remote base 120 through a secure connection 124. The infrastructure device 104 includes one or more sensors for sensing the road vicinity around construction equipment 108. These sensors may include one or more of cameras, radar, and lidar to detect objects, including road users and potential road users, in the vicinity of the infrastructure device 104.

Using input from its sensors, temporary infrastructure device 104 detects construction markers, such as the construction barrels 106, and determines their coordinates. Using the coordinates of the construction markers, the temporary infrastructure device 104 determines a temporary restriction on driving lanes, denoted in the figure by reference 102. This determination by device 104 may be aided by the detected path of road users such as vehicle 112 and motorcycle 114 and by map data containing road segments and drivable boundaries for the road in this system 100. The new drivable lanes restriction 102 is included in a data package transmitted to autonomous vehicle 128 and may also be sent to the remote base 120. The autonomous vehicle 128 uses the information on the drivable lanes restriction 102 in path planning to navigate itself through the construction zone and around equipment 108.

Using input from its sensors, the infrastructure device 104 may detect various example road users, including automobiles 110, 112, 126, and 128, buses (not shown), pedestrians (not shown), cyclist 118, and motorcyclist 114. The infrastructure device 104 may determine the location coordinates of each road user and classify each road user. In addition, using a combination of historical movement, observable behavior and behavior models, the infrastructure device 104 determines potential paths for each road user.

The infrastructure device 104, autonomous vehicle 128, and remote base 120 send messages to each other through communication links. The infrastructure device 104 and autonomous vehicle 128 both communicate with a remote base 120 through communication links 124 and 122, respectively. Infrastructure device 104 may also communicate through link 124 with autonomous vehicle 128 to send information about detected road users 110, 112, 114, 118, and 126 to the autonomous vehicle 128. Through the communication 124, autonomous vehicle 128 obtains information described above about the road users 110, 112, 114, 118, and 126 beyond what the sensors of the autonomous vehicle may detect from a distance. This information from infrastructure device 104 gives the autonomous vehicle 128 a more complete view of road users in its path.

More particularly, when the autonomous vehicle 128 enters within predetermined range of the infrastructure device 104, a communication link 124 is established between the infrastructure device 104 and the autonomous vehicle 128. In one example, this communication link 124 is one directional from the infrastructure device 104 to the autonomous vehicle 128. In another example the communication link 124 is bidirectional between autonomous vehicle 128 and infrastructure device 104.

For example, the remote base 120 uses autonomous vehicle 128 location updates received periodically through communication link 122 to initiate communication between the infrastructure device 104 and autonomous vehicle 128. When the autonomous vehicle 128 drives within a predetermined range of the infrastructure device 104, the remote base 120 transmits authorizing credentials to the infrastructure device 104 and to the autonomous vehicle 128. Infrastructure device 104 uses the authorizing credentials that it receives to embed authenticating data into a data set of information describing road users 110, 112, 114, 118, and 126. Infrastructure device 104 also encrypts the data set and transmits the data set to autonomous vehicle 128. The autonomous vehicle 128, now within a distance to receive and use the transmission from infrastructure device 104, uses the authorizing credentials that it receives from remote base 120 to authenticate and decrypt the data set contained within the transmitted message. This process establishes trusted communication 124 between the infrastructure device 104 and the autonomous vehicle 128. Through the trusted communication, the infrastructure device 104 transmits to the autonomous vehicle 128 coordinate data and may also transmit object classification, predicted path information, and other messages described herein.

When the construction project is finished, an operator may initiate a sequence on the infrastructure device 104 that sends an update to remote base 120, informing the remote base 120 that the device 104 will no longer be at the current road construction location. This message may also be used as an indication that the road construction is complete at the present site.

Figure 2:
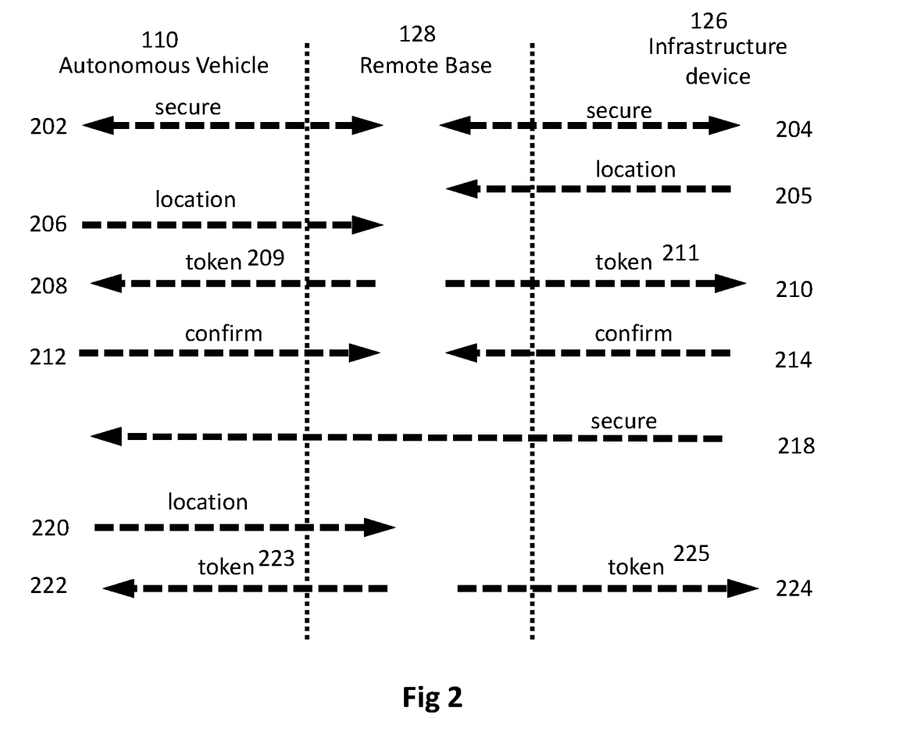
FIG. 2 is an example diagram of communications between a remote provider, an autonomous vehicle, and an infrastructure device.

Referring now also to FIG. 2, an example diagram of communications between a remote base 120 and the infrastructure device 104 and between the remote base 120 and the autonomous vehicle 128 is shown. The communications 202 and 204 (e.g., corresponding to communication links 124 and 122 in FIG. 1) are representative of general secure communications links between the remote base 120 and the infrastructure device 104 and the autonomous vehicle 128, respectively. The communications links 202 and 204 may be 4G or 5G wireless links with certificate-based PKI, secured DSRC, or any other suitable wireless communication approach, or combined wireless to land-based network approach, with any suitable security. In addition, infrastructure device 104 may be connected directly to a land-based network and communicate with the remote base 120 through the land-based network.

Over the secure link 202, each of the communications 206, 208, 212, 220, and 222 are made. Over the secure link 204, each of the communications 205, 210, 214, and 224 occur.

Message 205 is a location message that the infrastructure device 104 may send to the remote base 120 upon activation at a road construction site. This message 205 may include the location coordinates of temporary infrastructure device 104, as well as boundary information around the coordinates of temporary infrastructure device 104 for determining when a vehicle is within range of temporary infrastructure device 104.

Communication 206 represents a periodic location update from the vehicle 128 to the remote base 120 that can trigger communication between the infrastructure device 104 and autonomous vehicle 128. The remote base 120 may compare the location communicated from the vehicle to a predetermined boundary around infrastructure device 104. When remote base 120 determines that the autonomous vehicle 128 is within a predetermined range of infrastructure device 104, i.e., when the vehicle enters within the predetermined boundary, the remote base 120 sends through communications 208 and 210 security tokens 209 and 211 to the autonomous vehicle 128 and infrastructure device 104, respectively. Preferably the security tokens 209 and 211 are complementary tokens. The first token 209 is sent to the infrastructure device 104 for encrypting and embedding credentials with the information to be transmitted from infrastructure device 104. The second token 211 is sent to the autonomous vehicle 128 for decrypting the information and confirming the credentials in the transmission that autonomous vehicle 128 receives from infrastructure device 104. Communications 212 and 214 represent confirmation messages that the autonomous vehicle 128 and infrastructure device 104 each send to the remote base 120 confirming that each has received its security credentials.

Communication 218 represents a secure transmission from the infrastructure device 104 using the token 211 and received by the autonomous vehicle using the token 209. Over this secure communication 218, the information of road users detected by infrastructure device 104 is transmitted from the infrastructure device 104 to the autonomous vehicle 128 for use by the autonomous vehicle's self-driving computer system.

The remote base 120 may manage token expiration and renewals. The tokens 209 and 211 may have expiration times after which transmissions using token 211 are not recognized as authenticated. The remote base 120 may determine that the vehicle location, represented by location update communication 220, is still within the predetermined boundary of infrastructure device 104 after the tokens 209 and 211 expire. If so, remote base 120 sends new tokens 223 and 225 to the autonomous vehicle 128 and infrastructure device 104 using communications 222 and 224, respectively.

Figure 3:
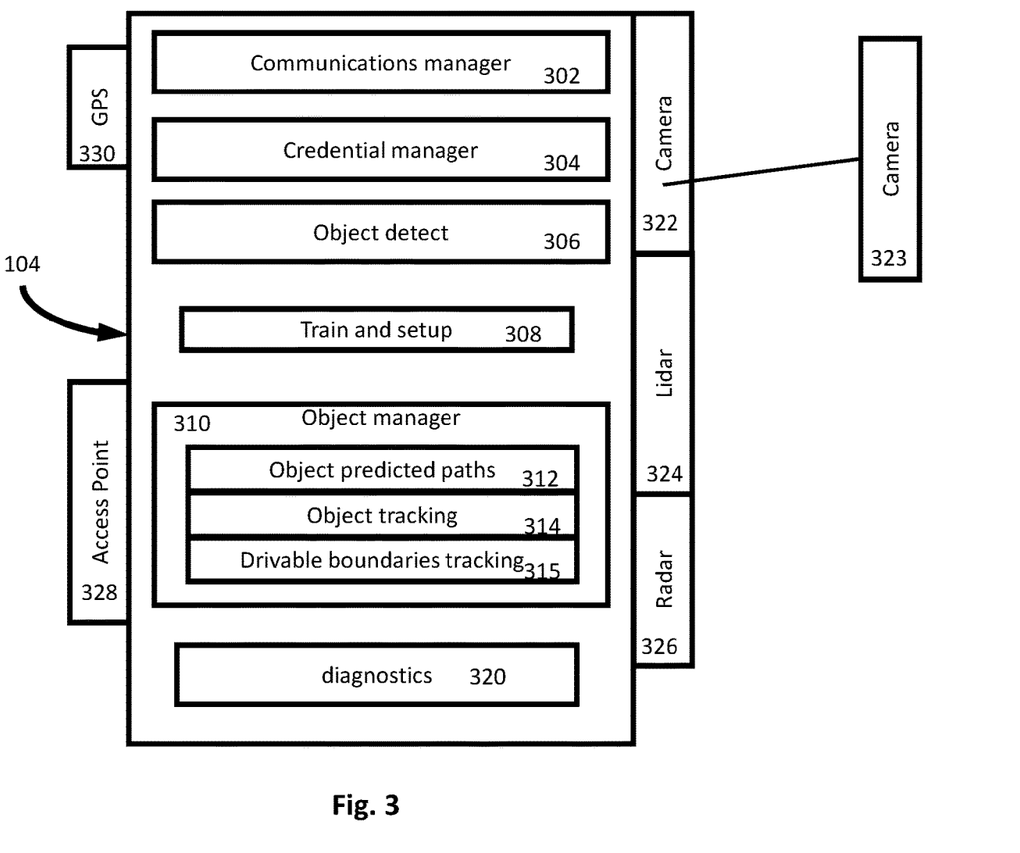
FIG. 3 is a diagram illustrating example functional elements of an infrastructure device.

Referring to FIG. 3, the diagram illustrates example functional elements of an infrastructure device 104. The infrastructure device 104 includes a communications manager 302, a credential manager 304, an object detect module 306, a training and setup module 308, an object manager 310 with predicted paths module 312 and object tracking module 314, and diagnostic module 320. The infrastructure device 103 also includes one or more cameras 322 and 323 as sensor inputs and may also include one or more LiDARs 324 and radars 326 with appropriate interfaces. An access point 328, such as a wireless network access point, or a combined wired and wireless network access point, is also included for communications with one or more remote bases and one or more autonomous vehicles. And GPS 330 may be included as a location input to the infrastructure device 104. In general, the modules 302-320 are software modules operating on a suitable computer hardware known to one skilled in the art using the information provided herein. Communications between infrastructure devices and vehicles as described in various examples herein may be implemented by one skilled in the art, including for example, utilizing equipment made for V2V and V2X communications modified to perform the functions described herein.

The training and setup module 308 may be used when the infrastructure device is first placed at a particular location. During the training and setup, the device "learns" the fixed features of the intersection or road segment from which its sensors receive data. This learning is readily accomplished by one skilled in the art using image processing techniques to detect non-transient portions of the intersection or road segment. An extended learning session may also be used to confirm base model behaviors for each class of detected object and road user.

Figure 4:
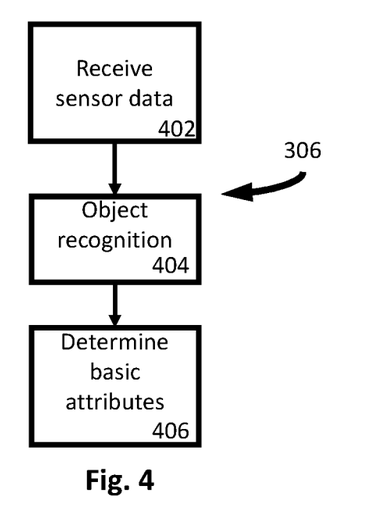
FIG. 4 is a diagram of example steps performed by the infrastructure device of FIG. 3.

Referring now also to FIG. 4, the object detect function 306 receives at 402 the data from sensors 322 and sensors 323, 324 and 326, if included, and processes the data to recognize objects. For example, visual data from camera sensors 322 and 323 may be processed through a software-implemented neural network (or other suitable machine learning or other image recognition model) trained on relevant images types (e.g., vehicles, pedestrians, cyclists, motorcyclists, etc.) for object recognition 404. If the radar 324 and LiDAR 326 are included, the data they produce may be used as inputs (1) directing the image recognition where to detect objects, (2) as inputs to the image recognition software, and (3) as logical inputs to the classification software. Multiple cameras 322 and 323 may be included and spaced apart from one another for better camera coverage of the traffic area of interest.

When an object is recognized, it is given a classification (such as automobile, truck, bus, bicycle, motorcycle, pedestrian, blowing garbage, etc.) and basic attributes at 406. Example attributes may include location coordinates computed from data from one or more of the sensors 322, 323, 324 and 326, combined with the GPS location data and potentially map reference data.

Figure 5:
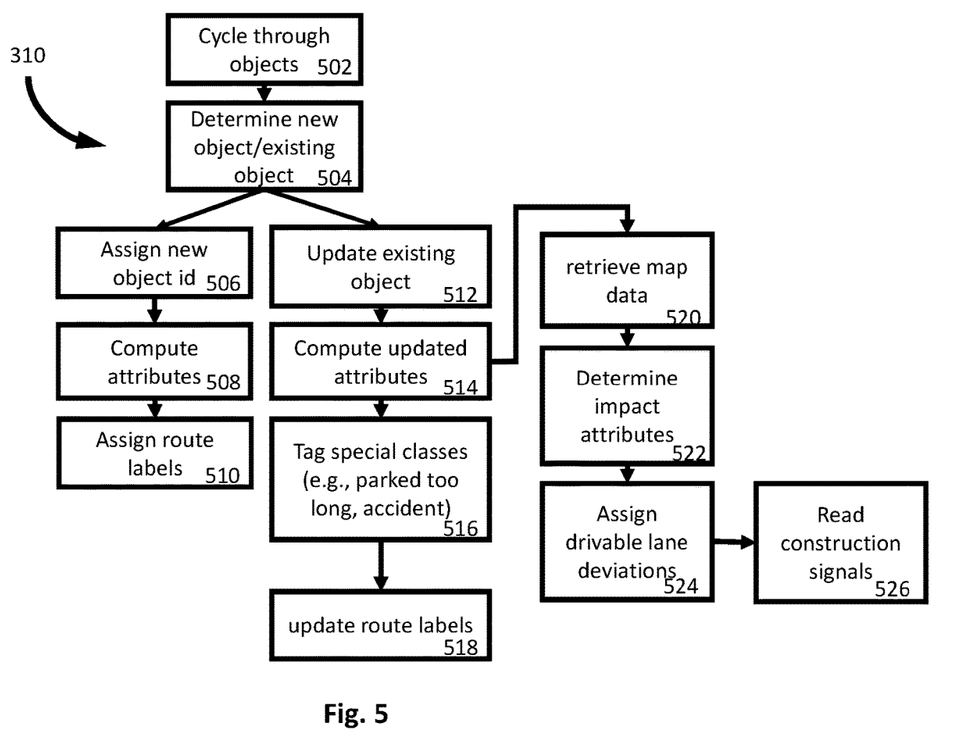
FIG. 5 is a diagram of example steps performed by the infrastructure device of FIG. 3 to manage detected objects.

Referring now also to FIG. 5, the object manager 410 tracks objects and assigns attributes in addition to those assigned by the object detect function 406. At 502 and 504, the object manager cycles through its list of existing objects and compares the objects to new data from the object detect module 406. From this comparison, the object manager determines whether a new object is detected, in which case the object is assigned a new identification for tracking purposes (506). Step 504 also determines whether the object is an existing object to be updated at step 512. New objects are given further attributes at 508, such as whether they are on-road, in travel lanes, on an off-road pedestrian area, in an intersection, or in a pedestrian crossing. In addition, attributes may include direction of travel, dimensions, confidence, and predicted path(s).

Based on the attributes, the object is also given route relevance tags at 510. For example, the route relevance tags may designate first route relevant data indicating a map segment that the road user is currently occupying and a second route relevant data indicating a map segment included in a predicted path of the road user. For example, autonomous vehicle 128 may have a route on which it comes into range of infrastructure device 104 but that will take the vehicle onto a street that does not lead to infrastructure device 128. If so, then only road users that have current or predicted paths that intersect with the path of vehicle 128 are relevant to vehicle 128.

Figure 6:
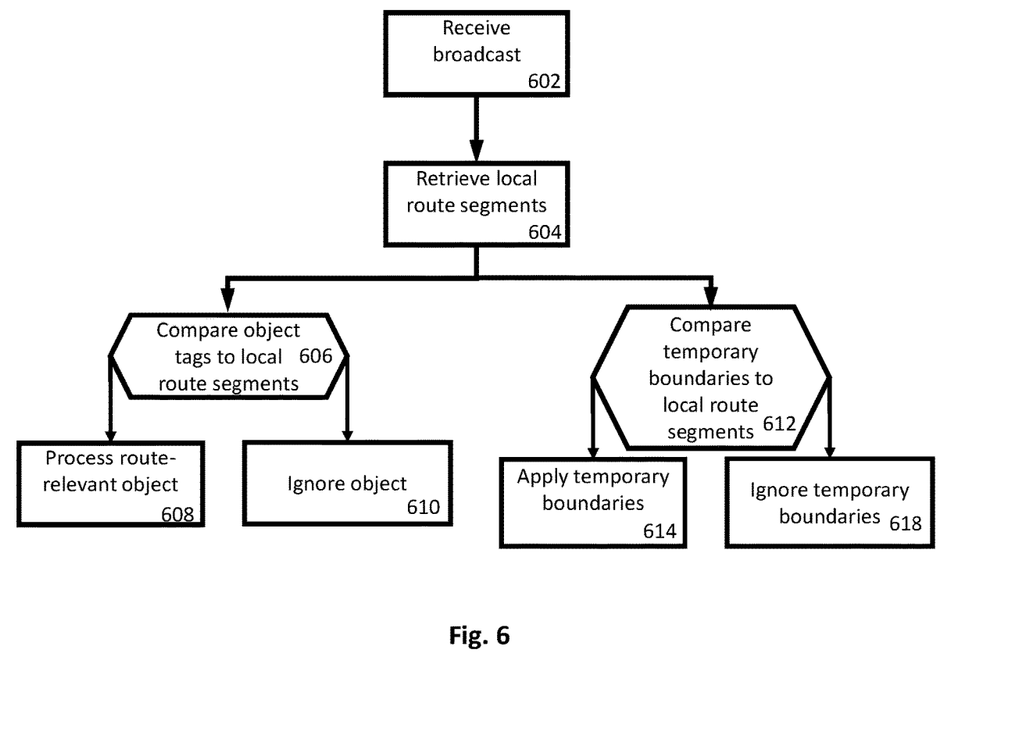
FIG. 6 is a diagram of example steps performed by an autonomous vehicle receiving information from an infrastructure device.

Using the tags, the autonomous vehicle 128 can readily sort road users to identify and use in perception and path planning functions those road users relevant to its planned route. For example, referring now also to FIG. 6, the autonomous vehicle 128 receives the broadcast data from the infrastructure device 104 at step 602. At 604, the autonomous vehicle's computer retrieves local route segments representative of the planned route of the autonomous vehicle 128 and at step 606 compares the route relevant tags of each object to the autonomous vehicle's planned route. The autonomous vehicle can then include the objects with relevant route tags with its processing 608 for perception of relevant road users and ignore other objects 610. This approach conserves the vehicle's processing resources by addressing in the vehicle's computers only to those objects relevant to the vehicle's path.

Referring again to FIG. 5, for an object that is being updated, the object manager computes updated attributes at 514. These include an updated position history of the object that may enable a more accurate predicted path. In addition, if an object falls within a special class, such as a vehicle that does not move for a predetermined amount of time, an object attribute is added, e.g., parked vehicle. At 518, based upon predicted paths for the object, the route relevance tags are updated.

For objects that are classified as road construction markers, the process moves to additional steps. At step 520, the process retrieves relevant map segment data, particularly the driving lane boundaries for the road segment at the construction area. At 522, the process compares the coordinates of the construction markers to the coordinates defined by the driving lane boundaries and determines whether and to what extent the construction markers are within in the driving lanes as defined by the map data driving lane boundaries. If the construction markers are within the driving lanes, then step 524 calculates adjusted driving lane boundaries (or temporary lane boundaries) based upon the position coordinates of the construction markers. The adjusted driving lane boundaries may be transmitted with other data to an autonomous vehicle receiving communications from the temporary infrastructure device 104.

Referring again to FIG. 1, construction workers 116 are associated with the construction work. In an example, the construction workers 116 may use standardized signs to direct traffic through the construction zone, or they may use a combination of standardized devices (such as lighted traffic wands of a known type) with standardized hand movements to direct traffic. If so, the temporary infrastructure device 104 may monitor the positions of the standardized signs or movements of the hand-held traffic wands, determine the construction workers' intended commands (526), and incorporate the commands in the data package sent to the autonomous vehicle.

Referring again to FIG. 6, the autonomous vehicle 128 compares at 612 the temporary lane boundaries received from infrastructure device 104 to the lane boundaries identified in local route segments in the autonomous vehicle's map memory. If the driving lane boundaries are the same (for example, if the autonomous vehicle's internal maps already indicate the construction zone changes), then the vehicle uses its internal data 618. If the temporary lane boundaries are not the same as the lane boundaries contained in the internal map data of the vehicle, then the vehicle uses the temporary lane boundaries sent from the infrastructure device 104 in its path planning operations.

Figure 7:
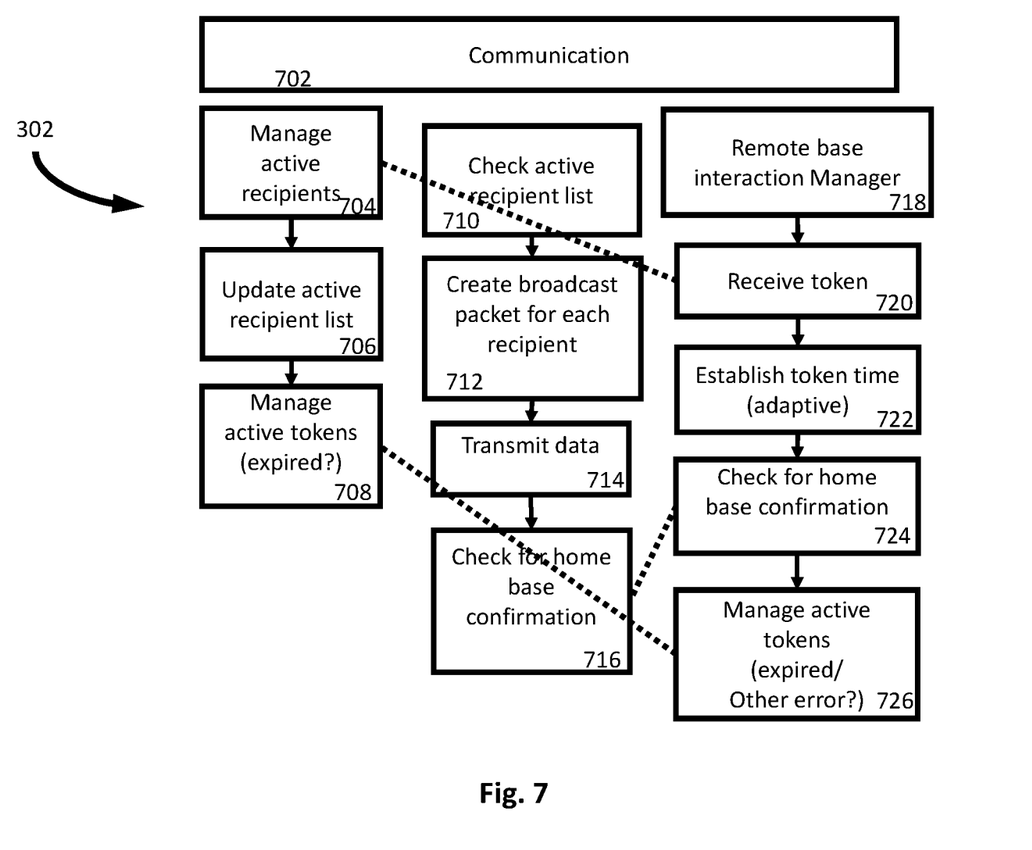
FIG. 7 is a diagram of examples steps performed by the infrastructure device of FIG. 3 for communication management.

Referring now also to FIG. 7, the communication manager 402 of infrastructure device 104 includes a communication software component that manages active connections with autonomous vehicles (704, 706 and 708), creates communication packages for each recipient (710, 712, 714, and 716), and manages remote base interactions (718, 720, 722, 724, and 726). To manage the active connections with autonomous vehicles, the infrastructure device 104 does not need to know the specific identification of each autonomous vehicle, it only needs a token for that autonomous vehicle. Additional information about the autonomous vehicle may be provided either by the autonomous vehicle during a two-way communication or by the remote base, but that additional information is not necessary. The active recipient list is updated at 706 for each token received from the remote base at 720 and again at 708 when each token expires or is revoked. The data package for each autonomous vehicle is created at 712 and transmitted at 714 only for those vehicles that have an active token. The vehicle receiving the transmitted data package may confirm receipt either through a bidirectional connection with the infrastructure device 104 or through a message to its remote base 120, which may relay the confirmation to the infrastructure device 104.

Each token received by the infrastructure device 104 may have an expiration time that may be adaptively set. For example, the infrastructure device 104 may use object tracking data to determine a traverse time representative of an amount of time that a vehicle is likely to be within the vicinity of the road segment monitored by infrastructure device 104. This traverse time may depend upon traffic and/or pedestrian conditions within this road segment. The traverse time may also be dependent upon traffic light system settings, such as signal duration settings for traffic light and pedestrian cross-walk signals, if present. The signal duration settings may vary according to preset times or may vary dynamically based upon sensed conditions (e.g., heavy traffic at a particular portion of an intersection). If the token duration is established adaptively at the infrastructure device 104, then the infrastructure device 104 communicates this duration to the remote base 120 so the duration can be communicated to the autonomous vehicle 128. Alternatively, an expiration time or token duration may be communicated with the data package transmitted to the autonomous vehicle 128. The remote base interaction manager 718 also checks for remote base confirmations, if available, indicative that the autonomous vehicle 128 has confirmed receipt of its token and also tracks (726) when a token expiration or revocation signal is received from the remote base, or other error in communication is reported by the remote base.

Referring again to FIG. 3, the infrastructure device 104 includes internal diagnostics module 320 with software operations known to those skilled in the art to monitor the operation of the various software modules. In addition, the diagnostics module 320 receives signals from each of the hardware components, including GPS 330, access point 328, cameras 322 and 323, LiDAR 324, and radar 326. These devices may have their own internal diagnostics functions and produce diagnostic error codes if not operating properly. If any of the hardware produces a diagnostic error code, the diagnostics module 320 uses preprogrammed fault logic to determine whether the infrastructure device may remain operational, or whether it should cease normal operation until the error is corrected. Diagnostic codes may be reported remotely to an operator or system (not shown) monitoring the device 104. In addition, an operator or system monitoring the device 104 may confirm the device is operational through communication initiated remotely, and track failures in the event the device is not responsive. If the device 104 is in a state during which it does not perform its typical operations to transmit data sets to vehicles, it (or its operating entity) may send a message to remote base 120 or to approaching autonomous vehicles informing them of its operational status.

In an example, some of the software functions illustrated in FIG. 3 and described above as performed by the infrastructure device 104 may be performed in whole or in part by another computer, server or "cloud" system. In this example, the infrastructure device 104 maintains an operative network connection with the other computer, server, or cloud system.

The infrastructure device 104 may also include a communication link to a municipal or other government administered system. Through this communication link, the infrastructure device may communicate relevant traffic data that aids the city planning function. In addition, the municipal system may send data to infrastructure device that may be useful to further communicate to autonomous vehicles. In another example, the connection to the municipal system may facilitate a transaction, such as accounting and payment for congestion pricing.

As can be seen, various examples of the present invention may provide several benefits to advanced transportation systems.

For example, by integrating the device and method of this invention into the road repair and construction process, the construction process becomes a cooperative source of information updates to automated driving and advanced transportation systems.

Also for example, an autonomous vehicle's effective sensing range, or "vision" to see road users and other objects of interest, is limited by the capabilities of its sensors and its processing power. Use of this invention may offer advantages over both of these limitations. By providing advanced information of objects and road users to the autonomous vehicle, the infrastructure device extends the vehicle's knowledge of information relevant to the vehicle's driving route beyond information known only through the vehicle's sensors. Through the communication and data transfer, the infrastructure device becomes another set of sensors serving the autonomous vehicle. Through its ability to process road user information for determining classification, attributes, and predicted paths, the infrastructure device offloads computing demands from the autonomous vehicle. In addition, locating a known object can be accomplished more effectively than scanning for unknown objects. Thus when the autonomous vehicle uses the information from the infrastructure device to locate objects that will come into range of the vehicle's sensors, it saves computational resources compared to the resources needed to scan for those objects as unknown potential objects.

Examples of this invention take advantage of wireless communications to link together autonomous vehicles and infrastructure so they play cooperative roles in driving in areas where their joint capabilities may lead to safer travel. The additional sensing capabilities of the infrastructure device, effectively an additional set of eyes on the road, when deployed in road segments that are higher in traffic or statistically shown to have higher risk of accident, may aid public confidence in advanced transportation and mobility technologies, including those used with autonomous vehicles.

The invention claimed is:

1. A method comprising the steps of:
receiving, in an infrastructure device mounted to a construction equipment located at a road construction zone with an input view of a predefined area of a road, sensor data of road users and the road construction zone;
in the infrastructure device and responsive to the sensor data, classifying objects as construction lane markers and determining coordinates of the construction lane markers;
using map data indicative of drivable lane boundaries of the road construction zone, determining in the infrastructure device whether the construction lane markers are within the drivable lane boundaries;
responsive to the determination of whether the construction lane markers are within the drivable lane boundaries, computing in the infrastructure device temporary lane boundaries for the construction zone; and
transmitting the temporary lane boundaries in a data set from the infrastructure device to at least one autonomous vehicle.

2. An apparatus including:
an equipment located in a road construction zone;
a device mounted to the construction zone equipment, including:
hardware for receiving sensor input data of a road segment proximate to the road construction zone;
a processing system responsive to the sensor input for detecting coordinates of and for classifying objects as construction lane markers;
a boundary tracking module responsive to the classified objects and a map data set including drivable lane boundaries for determining whether the construction lane markers are within the drivable lane boundaries and setting temporary lane boundaries if the construction lane markers are within the drivable lane boundaries; and
a communication system including:
a data module to create a data set including the temporary lane boundaries; and
a transmission module receiving the data set from the data module and transmitting the data set to the at least one autonomous vehicle.

3. A method according to claim 1, also including the steps of:
determining a first classification of at least one road user;
determining location coordinates of the at least one road user;
transmitting the location coordinates in the data set.

4. A method according to claim 3, also comprising the steps of:
determining a predicted path of the at least one road user responsive to the first classification;
transmitting the predicted path of the at least one road user in the data set.

* * * * *